March 2, 1943.  E. M. WETMORE  2,312,612
ROTOR
Filed June 28, 1940  2 Sheets-Sheet 1
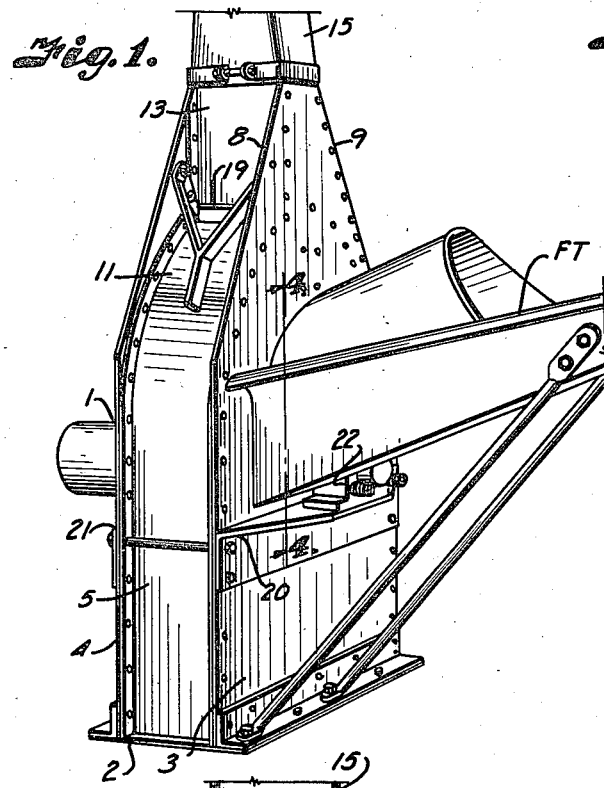
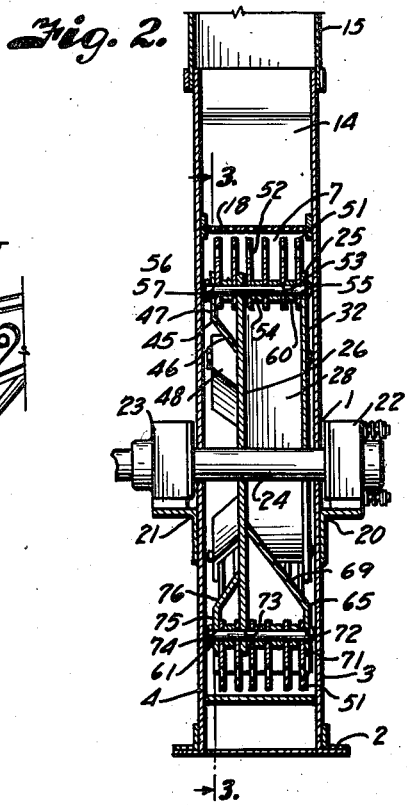
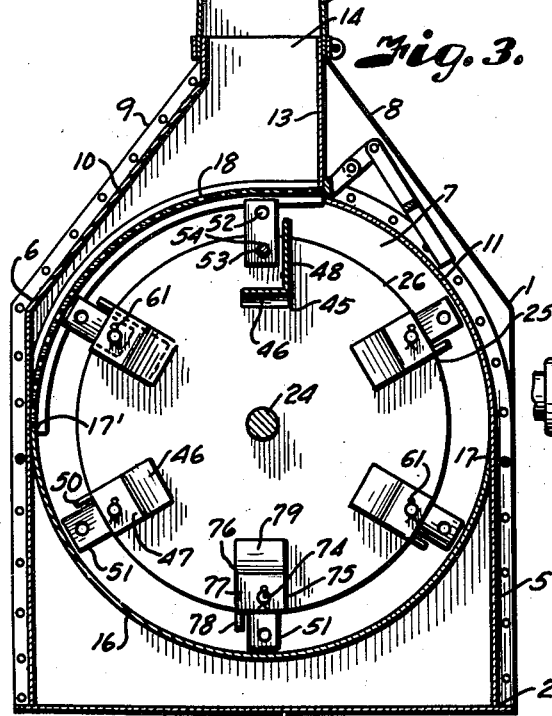
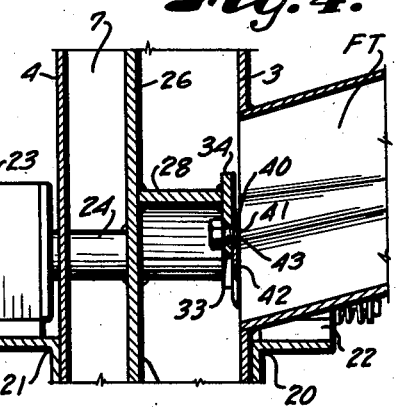
INVENTOR
Earnest M. Wetmore
BY
ATTORNEY

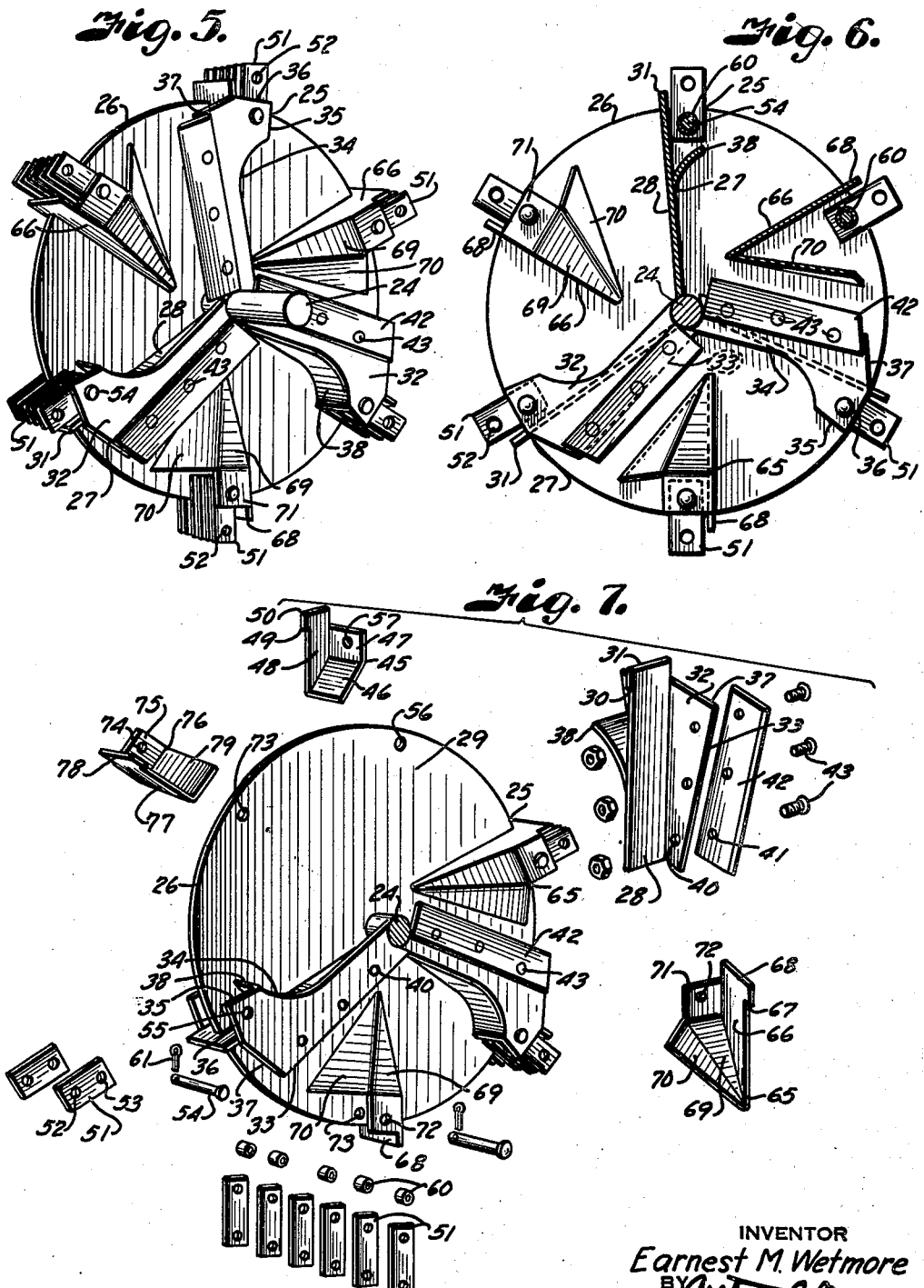

Patented Mar. 2, 1943

2,312,612

UNITED STATES PATENT OFFICE 2,312,612

ROTOR

Earnest M. Wetmore, Tonkawa, Okla.

Application June 28, 1940, Serial No. 342,971

5 Claims. (Cl. 146—107)

This invention relates to rotors, and more particularly to rotors for ensilage cutter and hammer mills, the principal objects of the present invention being to provide a convenient, economical, and highly efficient rotor.

Other objects of the present invention are to provide cutting devices or knives on the rotor that cut dry and wet feed, fodder, grasses and the like with equal facility; to provide for self cleaning of the rotor and preventing hanging up of the parts thereof due to collection of material thereon, as has heretofore been encountered in devices of this character; to provide for maintaining balance in the rotor during cutting, hammering and blowing actions thereof; to provide a more rigid mounting for rotor cutter knives than has heretofore been possible; to streamline fan blades and/or brackets on the rotor for improving the action of the rotor; to arrange the cutter knives in an improved relation to fan blades on the rotor; and to provide improved elements and arrangements thereof in a rotor of the character and for the purpose noted.

In accomplishing these and other objects of the present invention, I have provided improved details of structure, the preferred form of which is illustrated in the accompanying drawings wherein:

Figure 1 is a perspective view of an ensilage cutter and hammer mill provided with a rotor embodying the features of the present invention.

Figure 2 is a transverse vertical substantially central cross section through the mill illustrated in Figure 1 showing the relation of the rotor thereto.

Figure 3 is a vertical longitudinal cross section through the mill illustrated in Figure 1 substantially on the line 3—3, Figure 2, and showing the rear face of the rotor.

Figure 4 is a detail vertical transverse section through a portion of the mill substantially on the line 4—4, Figure 1, and illustrating the relation of the rotor, and particularly a cutter blade thereon, to the feed trough of the mill.

Figure 5 is a perspective view of a rotor embodying the features of the present invention.

Figure 6 is a side elevational view of the rotor shown in Figure 5, parts thereof being shown in section to better illustrate the construction of the rotor.

Figure 7 is a detail perspective view of the rotor embodying the present invention, parts thereof being shown in disassembled spaced relation.

Referring more in detail to the drawings:

1, Fig. 1, designates an ensilage cutter or hammer mill which preferably consists of a base 2 that supports spaced side walls 3 and 4 connected with spaced end walls 5 and 6 to form a housing enclosing a space 7. The upper ends of the side walls taper upwardly and inwardly as at 8 and 9. The upper end of the end wall 6 is directed angularly inwardly as shown at 10. The upper end of the end wall 5 is curved inwardly, as shown at 11, terminating as at 12. A vertically arranged wall 13 spaced from the end of the wall 5 is connected to and cooperates with the side walls and end 10 of wall 5 to form a discharge outlet 14 for the mill leading to a conduit 15 that may terminate in a suitable hopper, not shown.

Mounted on the side and end walls within the space 7 of the mill is a substantially circularly curved plate 16 connected to the walls 5 and 6, as at 17 and 17', forming the lower portion of a housing. The upper portion of the housing consists of a perforated screen 18 which forms a continuation of the housing and extends to the space between the wall 13 and the wall 5. The screen is held in place by a stop 19 closing the space through which the screen is inserted.

It is apparent that with the construction thus far described a cylindrical housing is provided having a perforated upper portion.

20 and 21, Figure 2, designate bearing brackets for supporting bearings 22 and 23 which, in turn, rotatably support a drive shaft 24 that extends through suitable aligned openings in the side walls 3 and 4 of the mill.

25, Figure 5, designates a rotor embodying the principal features of the present invention, which rotor preferably consists of a circular plate 26 that is mounted concentrically on the drive shaft 24. Secured to the plate 26 and radially arranged in spaced relation about the shaft 24 are bosses 27, of suitable number depending upon the size of the rotor and the duties to be performed thereby, the bosses each preferably consisting of a plate 28 secured, as by welding or the like, in edge engagement with the side face 29 of the rotor plate and projecting laterally from said face and radially from the shaft 24 beyond the periphery of the plate a distance defined by a shoulder 30 on the inner edge of the plate 28 that engages over the edge of the plate 26, the extension portion 31 of the plate 28 constituting a stop for a purpose presently described.

Arranged on the outer side edge of the plate 28 of each boss 27 is a base plate 32 arranged in substantially parallel relation to the rotor plate 26 and extending radially from the shaft 24 approximately to the periphery of the plate 26 and in laterally spaced relation to the plate 26. The base plate 32 preferably has a straight edge 33 on one side thereof and a curved edge 34 on the other side thereof, the latter terminating in a straight edge 35 at its outer end and connecting with the edge 33 by angular edges 36 and 37 at the outer end of the base plate 32. A reinforcing flange 38 is secured to the plate 28 of the boss and substantially follows the contour of the curved edge of the base plate 32, the flange 38 terminating at its outer end at the inner edge of the straight edge portion 35 of the plate 32.

Spaced openings 40 are provided on the base plate 32 adjacent the straight edge 33 thereof which are adapted to have openings 41 in a knife blade 42 aligned therewith, in such a manner that fastening devices 43 may secure the knife blade 42 to the base plate 32, the knife blade being of a length preferably corresponding to the length of the plate 32 and of a width sufficient to project laterally a suitable distance in one direction from the edge of the plate 32.

45 designates one of a series of seats, each of which preferably consists of a bottom wall 46, a side wall 47 and an end wall 48, the inner edges of the side and end walls being secured as by welding to the rotor plate 26 in such a manner that the side wall 47 aligns with the boss plate 28 and by means of a shoulder 49 engages the end of the rotor plate in such a manner as to provide for extension of the upper end 50 of the seat into the plane of the upper end 31 of the plate 28 of the boss 27 to cooperate therewith in forming a stop for hammers 51.

The hammers 51 are preferably plate-like in nature of rectangular shape and suitable thickness and provided with alignable apertures 52 and 53 at their ends whereby bolts or the like 54 may be extended through aligned apertures 55 in the base plate 32, 56 in the rotor plate 26, and 57 in the seat 45, as well as through the apertures 52 or 53 of the hammer blades for arranging the hammer blades on and securing the same to the rotor, it being apparent that certain of the hammer blades may be arranged on one side of the rotor and others on the other side thereof, the hammer blades being pivotally mounted on the rotor and allowed to pivot in one direction freely to points limited by the outer end of the flange 34 and the outer end of the bottom wall 46 of the seat, the hammer blades being limited in pivotal movement in the other direction by the stops 31 on the plate 28 and 50 on the seat 45.

If desired, spacer rings 60 are mounted on each bolt 54 between the hammer blades, and a suitable retaining device 61 is mounted in the end of the bolt exteriorly of the end wall 48 of the seat 45 to hold the hammer blades in desired position yet allow their replacement and/or inversion as and when desired.

65 designate streamlined bosses that are preferably arranged alternately between the bosses 27 that hold the cutter blades, the bosses 65 each preferably consisting of a plate 66 secured to the rotor plate 26 and projecting laterally therefrom. the outer end of the plate 66 is defined by a shoulder 67 and forms a stop 68 extending beyond the periphery of the rotor plate. A top flange 69 is provided on the outer edge of the plate 66 that tapers downwardly toward the rotor plate in the direction of the rotor plate drive shaft.

A flange 70 extends angularly inwardly from the edge of the flange 69 opposite the plate 66 and terminates in the plane of the rotor plate where it and the plate 66 may be secured to the rotor plate as by welding. 71 designates an end cap arranged between the ends of the flanges 66 and 70 in spaced relation to the rotor plate 26, the cap 71 having an aperture 72 aligned with an aperture 73 in the rotor plate and with an aperture 74 in an end cap 75 of a boss 76 arranged on the side of the rotor plate opposite the boss 65.

The bosses 76 each preferably include a plate 77 having an outer enlarged stop forming end 78 engageable and cooperative with the end 68 of the boss 65 to form a hammer blade stop. A bottom wall 79 is also provided on the boss 76, the outer edge 80 of which is secured as by welding to the side face of the rotor plate opposite the boss 65 in such a manner that the bosses 65 and 76 form seats on opposite sides of the rotor plate for hammer blades similar to the hammer blades 51 and arranged similarly thereto.

The operation of an ensilage cutter or hammer mill and a rotor associated therewith constructed as described is as follows:

Ensilage of either dry or wet character such as green feed, wet corn fodder, and/or grasses to be comminuted are applied to the feed trough, designated F. T. Figure 1, and introduced, as shown in Figure 4, to the interior of the chamber formed in the mill by the chamber forming plate 16. The drive shaft 24 for the rotor is rotated in an anticlockwise direction by suitable driving devices and the knives 42 on the bosses 27 slice, cut and initially prepare the ensilage for passage through the mill.

The centrifugal force generated in rotating the rotor throws the initially cut ensilage to the confines of the rotor chamber and against the inner face of the chamber forming wall 16 where the hammer blades 51 come into play to finely chop and grind the ensilage into minutely comminuted particles.

Centrifugal action of the rotor also causes the bosses 27, 45, 65 and 76, and particularly the edges thereof as well as their outer stop forming ends, to act as fan blades for blowing the comminuted ensilage around the housing formed by the plate 16 and out through the screen 18 into the discharge outlet 14 for subsequent disposition in a hopper or other collecting device.

Should rocks or other undesired debris be fed into the mill and be struck by the hammer blades, the hammer blades, being pivotally mounted in the bosses, may pivot in a direction opposite that of rotation of the rotor and pass by the rocks or other debris without serious damage to the hammer blades. Ordinarily the centrifugal force of the rotor in operation holds the hammer blades in outwardly extended operative condition.

Due to the streamlined contour of the bosses, minimum obstructing or ensilage catching surfaces are provided, the result of which is that hanging up of ensilage on the bosses is obviated. The rotor, therefore, maintains its balance and is operative over long periods of time without the requirement of constant supervision, cleaning, stopping the rotor and other disadvantages encountered in conventional hammer mills.

It is apparent, therefore, that the present invention provides an improved ensilage cutter or hammer mill that is convenient, economical, highly efficient and admirably suited for the accomplishment of the results for which it is intended.

What I claim and desire to secure by Letters Patent is:

1. In a device of the character described, a circular rotor plate, means for rotating said plate, a plurality of spaced bosses radially arranged about said plate on one side thereof, knife blades mounted on alternate bosses and extending inwardly approximately from the periphery of the rotor plate to the center thereof, hammers pivotally mounted on the outer ends of said bosses, bosses mounted on said plate on the side thereof opposite said first named bosses, said last named bosses being cooperative with the first named bosses in forming seats for said hammers, and means on said bosses extending inwardly and toward the rotor plate to provide for free flow around said bosses.

2. In a device of the character described, a rotor disk, means for rotating said disk, a plurality of spaced plates radially arranged on said rotor disk, hammers pivotally mounted on said plates, and means around the inner portion of the hammers having engagement with said plates, said means being tapered toward the axis of the rotor disk to provide for movement of material in said device around said hammers.

3. In a device of the character described, a rotor disk, means for rotating said disk, a plurality of spaced plates radially arranged on said rotor disk, flanges on said plates spaced from the disk, hammers pivotally mounted between the flanges and the rotor disk and supported by the rotor disk, and members extending inwardly toward the axis of the rotor disk and laterally toward the rotor disk, said members having engagement with the edges of the flanges and the side of the disk for closing the spaces inwardly of the hammers.

4. In a device of the character described, a circular rotor disk, means for rotating said disk, a plurality of spaced plates radially arranged on said rotor disk, flanges on the outer edges of said plates extending forwardly and rearwardly thereof, knife blades mounted on the forwardly extending flanges, said blades extending inwardly approximately from the periphery of the rotor plate to the center thereof, hammers pivotally mounted between the rearwardly extending flanges and the rotor disk and supported by the disk, and rearwardly curved members on the rear faces of said plates extending outwardly and rearwardly to close the spaces between the rearwardly extending flanges and the rotor disk inwardly of the hammers.

5. In a device of the character described, a circular rotor plate, means for rotating said plate, a plurality of spaced bosses radially arranged about said plate on one side thereof, hammers pivotally mounted on the outer ends of said bosses, bosses mounted on said plate on the side thereof opposite said first named bosses, said last named bosses being cooperative with the first named bosses in forming seats for said hammers, and angularly arranged members sloping inwardly toward the axis and radially toward the rotor plate having engagement with the sides of the rotor plate and the inner edges of the bosses to close the bosses under the hammer and provide free flow around said bosses.

EARNEST M. WETMORE.